(12) United States Patent
Delahanty et al.

(10) Patent No.: US 7,271,721 B2
(45) Date of Patent: Sep. 18, 2007

(54) PROTECTED DISTRIBUTION SYSTEM

(75) Inventors: James Delahanty, Apalachin, NY (US);
John W. Ramsay, Vestal, NY (US);
James D. Toher, Newark Valley, NY (US); Donald B. Wold, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 193 days.

(21) Appl. No.: 10/857,096

(22) Filed: May 28, 2004

(65) Prior Publication Data

US 2005/0275292 A1    Dec. 15, 2005

(51) Int. Cl.
*G08B 13/00* (2006.01)

(52) U.S. Cl. ............... 340/544; 340/605; 340/611; 340/614; 340/632; 340/665; 702/51; 73/1.57; 73/40.5 R; 73/592

(58) Field of Classification Search ............... 340/544, 340/605, 611, 614, 616, 618, 632, 665, 666, 340/310.11, 310.16, 310.17; 702/51, 47; 73/1.01, 1.06, 1.57, 592, 40.5 R
See application file for complete search history.

(56) References Cited

U.S. PATENT DOCUMENTS 3,610,808 A    10/1971   Horwinski
4,047,166 A  *  9/1977   Miller et al. .............. 340/940
4,598,168 A  *  7/1986   Wagner et al. ............. 174/115

(Continued)

OTHER PUBLICATIONS

Deutsch et al.; Characterization and Performance Evaluation of Differential Schielded Cables for Multi-Gb/s Data-Rates, Feb. 2002, IEEE Transactions on Advanced Packaging, vol. 25, No. 1, 16 pages.*

(Continued)

*Primary Examiner*—Davetta W. Goins
(74) *Attorney, Agent, or Firm*—Michael Best & Friedrich LLP

(57) ABSTRACT

An information transmission system comprising a conductor operable to carry a desired information signal. A first tube substantially surrounds the conductor and a second tube substantially surrounds the first tube to define a substantially fluid-tight chamber therebetween. In another aspect, the invention provides an information transmission system suited to transmit information between a first electronic device and a second electronic device located a distance from the first electronic device. The system includes an information transmission line that connects to the first electronic device and the second electronic device. A conduit surrounds at least a portion of the information transmission line. The conduit defines a substantially fluid-tight chamber. A quantity of fluid is disposed within the chamber and a sensor is positioned to measure a parameter of the quantity of fluid. An indicator is operable to signal a breach condition in response to the measured parameter.

40 Claims, 3 Drawing Sheets

U.S. PATENT DOCUMENTS

| | | | |
|---|---|---|---|
| 4,860,343 A | | 8/1989 | Zetena, Jr. |
| 5,162,609 A | | 11/1992 | Adriaenssens et al. |
| 5,351,388 A | * | 10/1994 | Van Den Berg et al. ... 29/602.1 |
| 5,418,878 A | | 5/1995 | Sass et al. |
| 5,565,652 A | * | 10/1996 | Frye ........................... 174/24 |
| 5,717,761 A | | 2/1998 | Yatagai |
| 6,058,168 A | | 5/2000 | Braband |
| 6,466,989 B1 | | 10/2002 | Chu |
| 6,480,963 B1 | | 11/2002 | Tachibana et al. |
| 6,487,695 B1 | | 11/2002 | Kranitzky |
| 6,600,423 B1 | * | 7/2003 | Rozier et al. ................ 340/611 |
| 6,737,976 B2 | * | 5/2004 | Rozier et al. ................ 340/611 |
| 6,810,337 B1 | * | 10/2004 | Ashcraft et al. .............. 702/51 |
| 2001/0007133 A1 | | 7/2001 | Moriconi et al. |
| 2001/0013418 A1 | | 8/2001 | Donner et al. |
| 2002/0117228 A1 | | 8/2002 | Nakajima et al. |
| 2002/0194507 A1 | | 12/2002 | Kanzawa et al. |
| 2003/0047342 A1 | | 3/2003 | Rotta et al. |
| 2003/0051163 A1 | | 3/2003 | Bidaud |
| 2003/0068143 A1 | | 4/2003 | Martinez et al. |

OTHER PUBLICATIONS

Vacumn Barrier Corporation; SEMIFLEX Bendable LN2 Piping Systems; http://www.vacuumbarrier.com/Food/semiflex1.html; viewed Oct. 29, 2003 (1 page).

Vacuum Barrier Corporation; SEMIFLEX Bendable LN2 Piping Systems; Advantages of Semiflex; http://www.vacuumbarrier.com/Products/advantages.html; viewed Oct. 29, 2003 (1 page).

SEMIFLEX Bendable LN2 Piping Systems; Points To Consider In LN2 Pipe System Design; http://www.vacuumbarrier.com/Products/points.html; viewed Oct. 29, 2003; (2 pages).

SEMIFLEX Bendable LN2 Piping Systems; Major Component Descriptions; http://www.vacuumbarrier.com/Products/components.html; (2 pages).

* cited by examiner

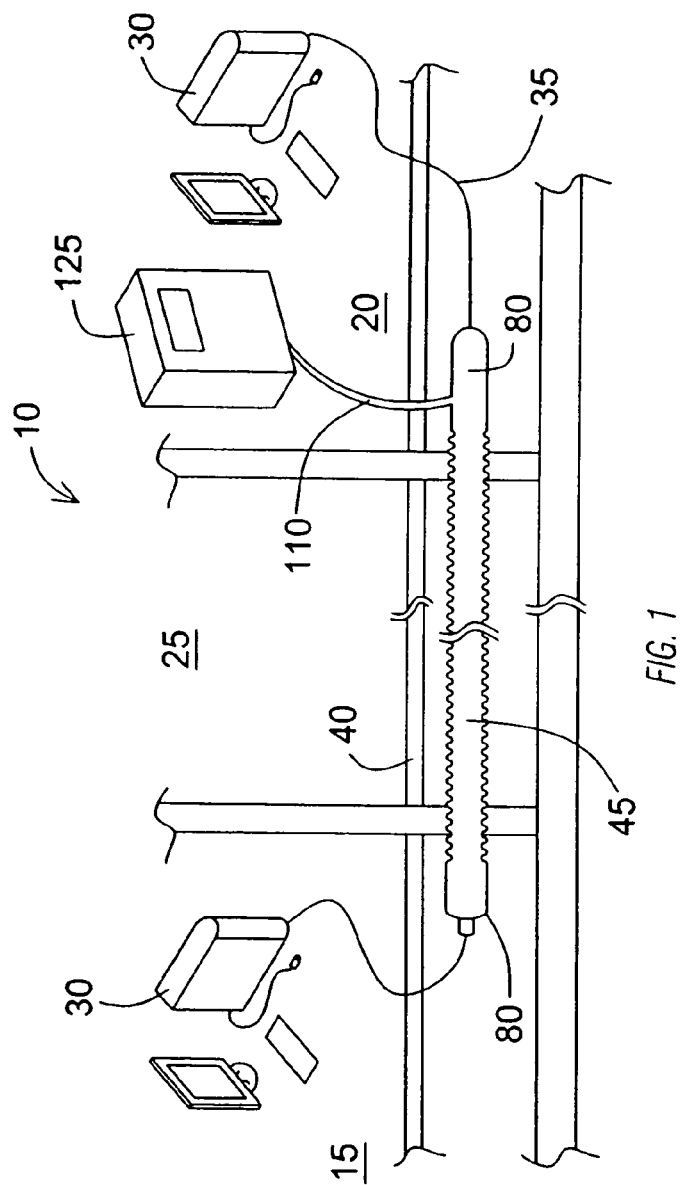
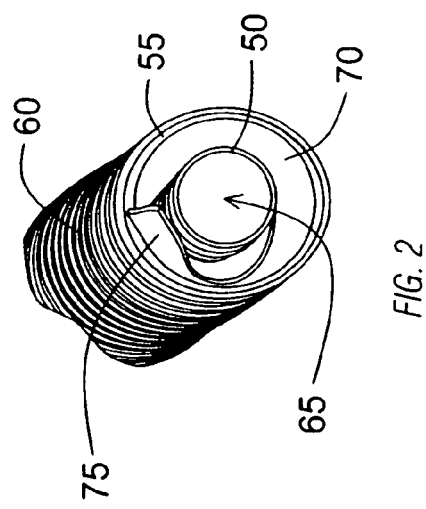

PROTECTED DISTRIBUTION SYSTEM

The invention was conceived or reduced to practice in the performance of work under U.S. Government Contract # N00019-93-C-0196 awarded by the U.S. Navy.

BACKGROUND

The present invention relates generally to information transmission systems. More particularly, the present invention relates to a system and method for detecting tampering with an information transmission system.

Information transmission, such as transmission between two computers in an office building, is often accomplished by sending the desired information through an information transmission line that interconnects the two computers. However, it is often required that this information be protected from surveillance or intrusion. If the entire building, or complex of buildings, is secured to a suitable level, the transmission of information presents fewer problems. However, as is often the case, a building may include different levels of security. As such, an information transmission may be required to travel from one room having a high level of security to another room having a high level of security by passing through a relatively low security area. In these situations, it is necessary to secure the information or the information transmission line as it passes through the low security area.

To secure the information, some facilities employ information encryption. The information is encrypted before it is transmitted and is decrypted at the receiving point. However, encryption systems can be expensive and complicated to operate, and tends to slow the information transmission.

In other situations, the information transmission lines are secured using sensors. The sensors are positioned adjacent the information transmission lines to detect any sort of tampering that may occur. Typical sensors include line-of-site long-range beam sensors, infrared sensors, and/or vibration wire. These sensors function best when they are designed as part of the building. However, when retrofitting them into an existing building, problems arise that make them difficult and costly to install and maintain. In addition, many of these systems require a straight, unobstructed path between the higher security areas to function properly.

SUMMARY

The present invention generally provides an information transmission system comprising a conductor operable to carry a desired information signal. A first tube substantially surrounds the conductor and a second tube substantially surrounds the first tube to define a substantially fluid-tight chamber therebetween.

In another aspect, the invention generally provides an information transmission system suited to transmit information between a first electronic device and a second electronic device located a distance from the first electronic device. The system includes an information transmission line that connects the first electronic device and the second electronic device. A conduit surrounds at least a portion of the information transmission line. The conduit defines a substantially fluid-tight chamber. A quantity of fluid is disposed within the chamber and a sensor is positioned to measure a parameter of the quantity of fluid. An indicator is operable to signal a breach condition in response to the measured parameter.

In still another aspect, the present invention generally provides a method of detecting tampering or other breach condition of an information transmission line. The method includes surrounding at least a portion of the information transmission line with a conduit and sealing the conduit to define a substantially fluid-tight chamber. The method also includes providing a fluid to the fluid-tight chamber and monitoring the pressure of the fluid within the fluid-tight chamber. The method further includes signaling a breach condition when the pressure within the fluid-tight chamber changes more than a predetermined magnitude.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a schematic illustration of an information transmission system including end seals and an information transmission line;

FIG. 2 is a perspective view of an end of the information transmission system of FIG. 1;

DETAILED DESCRIPTION

Figure 3:
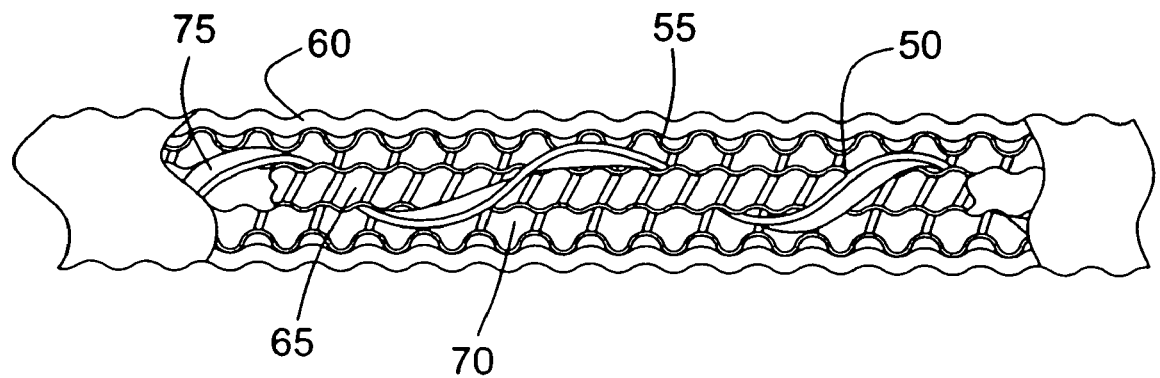
FIG. 3 is a partially broken away view of the information transmission system of FIG. 1.

Before describing an embodiment of the invention in detail, a brief discussion of building security is necessary. Most office or factory buildings, or complex of buildings, include some level of security. In most cases, this security is low, comprising mainly locks (electronic or mechanical) on the doors or security guards or receptionists at the entrance. However, some industries (e.g., computer chip developers, software developers, toy manufactures, and the like) often require additional security to inhibit or prevent unwanted intrusion. To that end, buildings occupied by these industries often include varying levels, or layers of security. For example, one building may allow entry of any person with an ID badge but may limit the access of that person to only certain areas. Thus, a single building may include two or more security levels, with one security level being lower than the other security level. The lower security level may still be quite high when compared to typical office buildings. For example, the low security level may be classified as "Low Security" thus requiring significant security, while the high security level may be "Restricted Access" thus requiring security precautions in addition to those provided in the lower security area.

The present invention allows for the secure and relatively inexpensive transmission of information from one higher security area to another higher security area through a lower security area. However, the invention should not be limited to any particular security level, as it will function to transmit information from one room to another no matter the security level in the rooms or between the rooms. Thus, while the invention is described as transmitting information from one high security room to another high security room via a low security area, these terms are not meant to categorize the actual level of security employed. Rather, they indicate a relative difference in security and are used for exemplary purposes only. In addition, the invention is described as extending between two rooms in a building. However, the invention could be used to connect rooms in different buildings if desired.

With reference to FIG. 1, a portion of a building 10 including multiple levels of security is illustrated schematically. The building includes a first area 15 or room and a second area 20 or room separated by a third area 25. The first and second areas 15, 20 contain electronic devices 30 such as computers or other information transmission or storage devices. An information transmission line 35 extends between the first area 15 and the second area 20 to interconnect the electronic devices 30. In the construction illustrated in FIG. 1, the information transmission line 35 passes through a space beneath a false floor 40. However, other constructions may route the information transmission line 35 through walls or a ceiling if that is more convenient.

In most applications, the first area 15 and the second area 20 are high security areas (e.g., laboratories, offices, engineering areas, and the like), while the third area 25 is a low security area (e.g., hallways, conference rooms, cafeterias, and the like). As such, the information transmission line 35 passes from high security to low security and back to high security. To maintain the security level of the information, the portion of the information transmission line 35 within the low security area is enclosed in a conduit 45.

The conduit 45 includes a first or inner tube 50, a second or outer tube 55 that surrounds the inner tube 50, and an optional coating 60 that surrounds the outer tube 55 as illustrated in FIG. 2. In some constructions, the inner tube 50 and the outer tube 55 are formed from corrugated copper. However, other constructions may employ non-corrugated tube for one or both of the inner tube 50 and the outer tube 55. In addition, other tube materials such as plastic, composite, and the like can be used with copper and other metals being preferred. The use of copper, as well as other metals, as the material to manufacture the inner tube 50 and the outer tube 55 further enhances the information protection capability of the present invention. The copper at least partially shields any electromagnetic emissions emanating from the information transmission line 35. This shielding inhibits the passive monitoring of the information as it is transmitted.

The coating 60 protects the outer tube 55 from abrasion or damage that may occur during the installation and/or operation of the conduit 45. In addition, the coating 60 protects the outer tube 55 from corrosion and other environmental damage that may impair the function of the conduit 45 over time.

The inner tube 50 defines a conductor space 65 sized to allow for the passage of the information transmission line 35. In addition, the tubes 50, 55 cooperate to define a portion of an annular chamber 70 that extends substantially the entire length of the conduit 45.

A spacer piece 75 extends the length of the inner and outer tubes 50, 55 in a helix pattern such that it periodically contacts both the inner tube 50 and the outer tube 55. The spacer 75 does not form a seal between the inner tube 50 and the outer tube 55. Rather, the spacer 75 maintains the desired gap between the inner tube 50 and the outer tube 55 and maintains the inner tube 50 in a substantially centered position within the outer tube 55. The spacer 75 is made from any suitable material with TEFLON or another plastic being preferred. The spacer 75 assures that the information transmission line 35 is not in direct physical contact (metal to metal contact) with the outer tube 55. This additional isolation may reduce the likelihood of passive monitoring of the signal being transmitted via the information transmission line 35. While preferred constructions employ the spacer 75 as illustrated in FIGS. 2 and 3, other constructions may function without the spacer 75 or with a different spacer (e.g., rubber annular washers and the like).

An end cap 80 is positioned at either end of the inner tube 50 and outer tube 55 within the first area 15 and the second area 20 to complete the conduit 45 as shown in FIG. 1. A conduit 45 similar to that just described is sold by Vacuum Barrier Corporation of Woburn, Mass. under the trade name SEMIFLEX.

Figure 4:
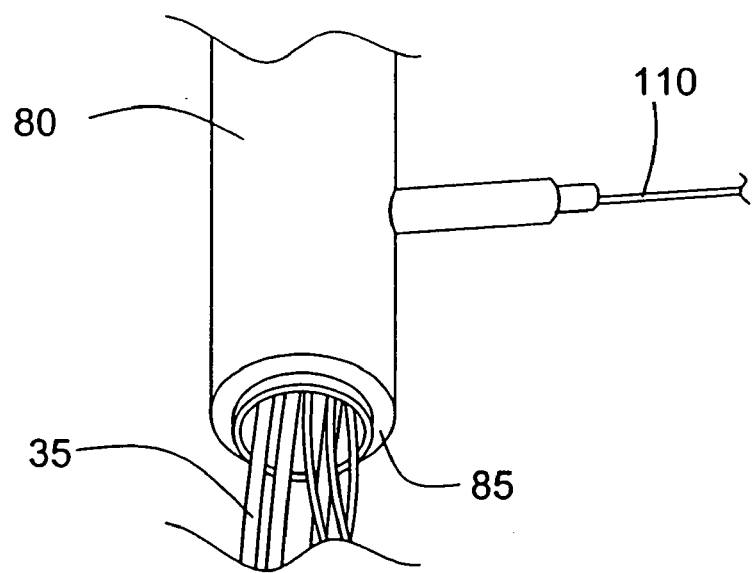
FIG. 4 is a perspective view of the end seal of FIG. 1.
Figure 5:
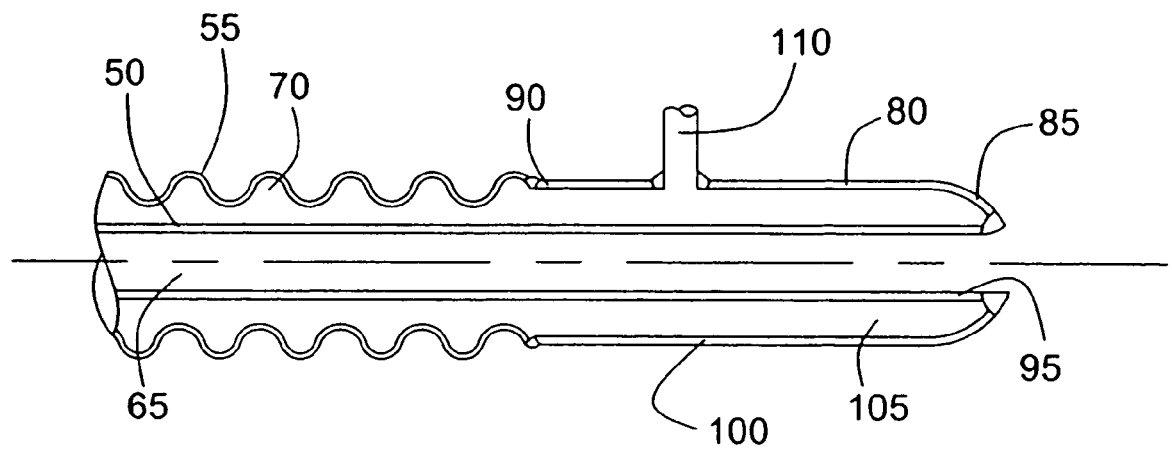
FIG. 5 is a section view of the end seal of FIG. 4.

The end caps 80, illustrated in FIGS. 4 and 5, include an open end 85 that provides for the passage of conductors through the conduit 45 and an attached end 90 that attaches to the inner tube 50 and the outer tube 55. Each of the end caps 80 includes an inner wall 95 and an outer wall 100 that attach to one another near the open end 85 to define the open ends 85 of each end cap 80. The inner wall 95 and the outer wall 100 are separated from each other at the attached end 90 of the end cap 80. Thus, the inner and outer walls 95, 100 cooperate to define an annular space 105 that terminates adjacent the open end 85.

The inner walls 95 of the end caps 80 attach to either end of the inner tube 50 and the outer walls 100 attach to either end of the outer tube 55 to complete the conduit 45. The walls 95, 100 and tubes 50, 55 can be attached using any suitable means (e.g., brazing, soldering, adhesive, and the like) with welding being preferred. With the end caps 80 attached, the inner walls 95 cooperate with the inner tube 50 to complete the conductor space 65. The annular spaces 105 seal the ends of the chamber 70 to complete the chamber 70. Thus, the chamber 70 surrounds all but the open ends of the conductor space 65, which are preferably disposed within the high security areas 15, 20.

Figure 6:
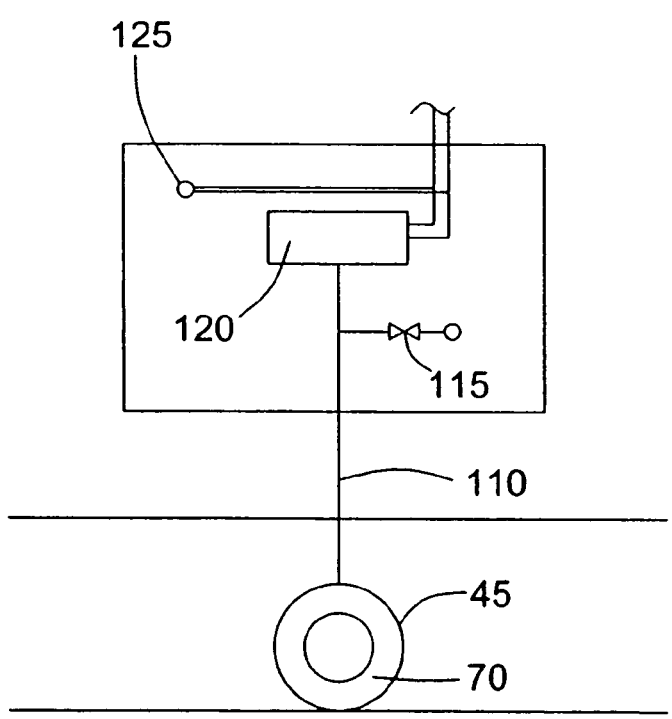
FIG. 6 is a schematic illustration of an alarm system including the information transmission system of FIG. 1.

One or both of the end caps 80 include a supply line 110 that is in fluid communication with the chamber 70. The supply line 110 connects to a release/fill valve 115 (shown in FIG. 6) that provides for fluid communication between a source of high-pressure air (e.g., compressor, shop air, etc.) and the chamber 70. The valve 115 can be configured to admit high-pressure air into the chamber 70, to vent high-pressure air from the chamber 70, or to seal the supply line 110 and the chamber 70. In addition, the supply line 110 provides for fluid communication between the chamber 70 and a sensor 120 that measures a parameter such as the pressure within the chamber 70. It should be noted that supply lines 110 and sensor 120 could be positioned anywhere desired. Preferably, the sensor 120 is located within the high security area along with one of the first and second electronic devices. However, the invention should not be limited to supply lines 110 and sensors 120 positioned in the end caps 80 or the high security areas alone.

The sensor 120 provides a signal corresponding to the measured pressure to an alarm system 125. The alarm system 125 signals a breach condition when the pressure falls below or exceeds a predetermined value. As used here, a "breach condition" is any condition that results in a sufficient pressure change to be sensed by a sensor regardless of the cause. "Breach condition" includes but is not limited to pressure changes caused by tampering, intrusions, accidental breakage, and deterioration due to aging or environmental causes. The alarm system 125 may also trigger an audible or visual alarm in addition to initiating other steps to secure the information transmission line 35 (e.g., terminating all information transmission). One sensor 120 suited to use with the present invention is the Modus Pressure Alarm Control and Digital Pressure Gage as sold by Modus Instruments Inc., of Clinton, Mass.

To use the present invention, the conduit 45 is first installed between two or more devices 30, such as computers as illustrated in FIG. 1. When installed, the portion of the information transmission lines 35 disposed in the low security area 25 is completely surrounded by the chamber 70. The only exposed information transmission lines 35 extend from the open ends 85, which are preferably disposed within the high security areas 15, 20. Thus, to breach the information transmission line 35 in the low security area 25, one must first penetrate the chamber 70.

The chamber 70 is charged, or pressurized with a fluid, such as air to a pressure sufficiently above or below atmospheric pressure so that the sensors may detect a breach condition. Before proceeding, it should be noted that pressure levels can be measured as gauge pressures or absolute pressures. The pressure levels described herein are gauge pressures. However, one of ordinary skill in the art will realize that the sensors will function using either gauge pressure or absolute pressure. While many different pressure levels will function, a pressure level in excess of about 20 pounds per square inch gauge is preferred. In most constructions, an initial pressure of about 25 pounds per square inch gauge functions well, with higher or lower pressure (e.g., above 25 psig or below 20 psig) being suitable for different applications. The actual pressure used in each application is a function of many variables (e.g., sensor sensitivity, volume/length of the conduit, seal quality, temperature fluctuations, etc.). Present sensors 120 will detect a pressure drop or increase of 3 psi with few errors or nuisance alarms. More accurate sensors may allow for the accurate detection of a 1 psi pressure change or an even smaller pressure change. As such, the pressure values described herein can be modified based on the accuracy or sensitivity of the sensor. Likewise, the volume of the conduit 45 may necessitate changes in the pressure values. For example, a higher pressure may be desirable in a larger conduit 45 to assure that the pressure drops quickly in response to a breach. In addition, monitoring for a smaller pressure drop may be desirable in large volume conduits 45 to assure that any tampering is detected quickly.

Air is initially supplied to the chamber 70 via the supply line 110 that feeds into the chamber 70. The supply line 110 is then closed to substantially seal the chamber 70. The pressure within the chamber 70 is then periodically or continuously monitored.

If the pressure changes a predetermined amount, typically in excess of about 3 pounds per square inch, the alarm system 125 will signal a breach condition. In preferred constructions, a pressure drop of about 5 pounds per square inch triggers the breach condition. In another construction, the sensor 120 measures the rate of pressure change rather than the actual pressure drop to detect tampering and trigger the breach condition.

In yet another construction, a second sensor measures a temperature, such as the fluid temperature within the chamber 70. The alarm system uses the measured temperature to compensate for pressure changes caused by local temperature changes. For example, a temperature change may cause a pressure drop in the conduit of 1 psi. Without temperature compensation, another 2 psi drop would be all that is required to trigger a breach condition. By compensating for the temperature change, the system is able to maintain the pressure drop required to trigger the breach condition at a desired value (e.g., 3 psi), thus reducing nuisance alarms.

Once a breach condition is signaled, the alarm system 125 may initiate an alarm. The alarm may be audible, visual, or both. In addition, the alarm system 125 may alert security and/or cut off information flow through the information transmission line 35. As one of ordinary skill will realize, the reaction of the alarm system 125 to the breach condition may vary greatly depending on the particular application.

While the present invention has been described as using high-pressure air to fill the chamber 70, one of ordinary skill will realize that other gasses could be used if desired. In addition, rather than using high-pressure air, a partial vacuum could be employed. In constructions that employ a partial vacuum, the sensor 120 would monitor the pressure within the chamber 70 with an increase in pressure indicating tampering.

Although the invention has been described in detail with reference to certain preferred embodiments, variations and modifications exist within the scope and spirit of the invention as described and defined in the following claims.

What is claimed is:

1. An information transmission system comprising:
   a conductor operable to carry an information signal;
   a first tube substantially surrounding and spaced apart from the conductor; and
   a second tube substantially surrounding and spaced apart from the first tube to define a substantially fluid-tight chamber therebetween.

2. The information transmission system of claim 1, wherein at least one of the first tube and the second tube includes a metal.

3. The information transmission system of claim 1, further comprising a first end seal disposed near a first end of the second tube and a second end seal disposed near a second end of the second tube, the first end seal and the second end seal at least partially forming the substantially fluid-tight chamber.

4. The information transmission system of claim 1, further comprising a quantity of fluid disposed within the fluid-tight chamber.

5. The information transmission system of claim 4, wherein the quantity of fluid is maintained at a pressure in excess of atmospheric pressure.

6. The information transmission system of claim 4, wherein the fluid is air.

7. The information transmission system of claim 4, wherein the quantity of fluid is maintained at a pressure in excess of about 20 pounds per square inch gauge.

8. The information transmission system of claim 4, wherein the quantity of fluid is maintained at a pressure, and the absolute value of the differential between the pressure and atmospheric pressure is at least about 3 psi.

9. The information transmission system of claim 1, further comprising a release/fill valve in fluid communication with the fluid-tight chamber.

10. The information transmission system of claim 1, wherein at least a portion of the contents of the fluid-tight chamber are removed to define a partial vacuum.

11. The information transmission system of claim 1, further comprising a sensor positioned to measure the pressure within the fluid-tight chamber.

12. The information transmission system of claim 11, further comprising an alarm system operable to trigger a breach condition in response to the measured pressure.

13. The information transmission system of claim 1, wherein the information transmission system is positioned such that a first portion is disposed in a first secured area and a second portion is disposed in a second secured area, the first secured area having a higher level of security than the second secured area, the sensor located in the first secured area.

14. An information transmission system suited to transmit information between a first electronic device and a second electronic device located a distance from the first electronic device, the information transmission system comprising:

an information transmission line connected to the first electronic device and the second electronic device;

a conduit surrounding at least a portion of the information transmission line, the conduit defining a substantially fluid-tight chamber;

a quantity of fluid disposed within the chamber and selected to define a charge pressure sufficiently different from atmospheric pressure so that a leak in the conduit results in a measurable change in the charge pressure sufficient to indicate a breach condition;

a sensor positioned to measure the actual pressure of the quantity of fluid; and an indicator configured to signal the breach condition when the actual pressure differs from the charge pressure by more than a predetermined value.

15. The information transmission system of claim 14, wherein at least one of the first electronic device and the second electronic device is a computer.

16. The information transmission system of claim 14, wherein the first electronic device is located in a first secured area and the second electronic device is located in a second secured area disposed at a distance from the first secured area.

17. The information transmission system of claim 16, wherein the sensor is located in one of the first secured area and the second secured area.

18. The information transmission system of claim 16, wherein a portion of the information transmission line passes through a less secured area that is less secured than the first secured area and the second secured area, and wherein the conduit surrounds the portion of the information transmission line disposed within the less secured area.

19. The information transmission system of claim 14, wherein the conduit includes a first tube that at least partially surrounds the information transmission line and a second tube spaced from the first tube that at least partially surrounds the first tube, the first tube and the second tube cooperating to at least partially define the chamber there between.

20. The information transmission system of claim 19, wherein the conduit includes a first end seal disposed near a first end of the conduit and a second end seal disposed near a second end of the conduit, the first end seal, the second end seal, the first tube, and the second tube cooperating to at least partially form the substantially fluid-tight chamber.

21. The information transmission system of claim 14, wherein the conduit includes a first end seal disposed near a first end of the conduit and a second end seal disposed near a second end of the conduit, the first end seal, the second end seal, and the conduit at least partially forming the substantially fluid-tight chamber.

22. The information transmission system of claim 14, wherein the quantity of fluid is maintained at a pressure in excess of atmospheric pressure.

23. The information transmission system of claim 14, wherein the quantity of fluid is maintained at a pressure in excess of about 20 pounds per square inch gauge.

24. The information transmission system of claim 14, wherein the breach condition is signaled in response to a pressure drop within the substantially fluid-tight chamber.

25. The information transmission system of claim 24, wherein the breach condition is signaled in response to a pressure drop of at least 3 pounds per square inch.

26. The information transmission system of claim 14, wherein the sensor is a pressure sensor.

27. The information transmission system of claim 14, wherein the information is unencrypted.

28. The information transmission system of claim 14, wherein the fluid is air.

29. The information transmission system of claim 14, wherein the quantity of fluid is maintained at a pressure, and the absolute value of the differential between the pressure and atmospheric pressure is at least about 3 psi.

30. The information transmission system of claim 14, further comprising a release/fill valve in fluid communication with the fluid-tight chamber.

31. The information transmission system of claim 14, wherein the quantity of fluid within the fluid-tight chamber is maintained at a partial vacuum.

32. A method of detecting a breach of an information transmission line, the method comprising:

surrounding at least a portion of the information transmission line with a conduit;

sealing the conduit to define a substantially fluid-tight chamber;

providing a fluid to the fluid-tight chamber, the quantity of fluid being selected to define a charge pressure that is sufficiently different from atmospheric pressure such that a leak in the conduit results in a measurable change in the charge pressure that is sufficient to indicate a breach condition;

monitoring an actual pressure of the fluid within the fluid-tight chamber; and signaling a breach condition when the actual pressure within the fluid-tight chamber differs from the charge pressure by more than a predetermined magnitude.

33. The method of claim 32, wherein the providing step includes providing the fluid within the fluid-tight chamber at a pressure above atmospheric pressure.

34. The method of claim 33, wherein the fluid is provided at a pressure at least about 3 psi greater than atmospheric pressure.

35. The method of claim 32, further comprising detecting a change in pressure within the chamber.

36. The method of claim 32, wherein the information transmission line is at least partially disposed within a first secured area and a second secured area, the first secured area having a level of security that is higher than the second secured area, and wherein the monitoring step includes positioning a sensor within the first secured area.

37. The method of claim 32, further comprising detecting a change in pressure within the chamber of at least about 3 pounds per square inch.

38. The method of claim 32, wherein the surrounding step includes surrounding the information transmission line with a first tube and surrounding the first tube with a second tube.

39. The method of claim 32, wherein signaling a breach condition includes triggering an alarm.

40. An information transmission system suited to transmit information between a first electronic device and a second electronic device located a distance from the first electronic device, the information transmission system comprising:

an information transmission line connected to the first electronic device and the second electronic device;

a conduit surrounding at least a portion of the information transmission line, the conduit defining a substantially fluid-tight chamber;

a quantity of fluid disposed within the chamber to define a pressure, the pressure being substantially uniform throughout the chamber;

a sensor positioned to measure a parameter of the quantity of fluid; and an indicator operable to signal a breach condition in response to the measured parameter.

* * * * *